(12) United States Patent
Bernabeu-Auban et al.

(10) Patent No.: US 7,434,228 B2
(45) Date of Patent: Oct. 7, 2008

(54) STRUCTURING AN OPERATING SYSTEM USING A SERVICE ARCHITECTURE

(75) Inventors: Jose M. Bernabeu-Auban, Sammamish, WA (US); Jeff L. Havens, Issaquah, WA (US); Yousef A. Khalidi, Bellevue, WA (US); Frank V. Peschel-Gallee, Redmond, WA (US); Madhusudhan Talluri, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 534 days.

(21) Appl. No.: 11/129,847

(22) Filed: May 16, 2005

(65) Prior Publication Data

US 2006/0271941 A1   Nov. 30, 2006

(51) Int. Cl.
*G06F 13/00* (2006.01)
(52) U.S. Cl. .................. 719/316; 719/330; 719/331; 719/332
(58) Field of Classification Search ............. 719/330, 719/331, 332, 316
See application file for complete search history.

(56) References Cited

U.S. PATENT DOCUMENTS

| | | | |
|---|---|---|---|
| 7,171,672 B2* | 1/2007 | Just | 719/330 |
| 2004/0083483 A1* | 4/2004 | Yamamoto et al. | 719/316 |
| 2004/0205771 A1* | 10/2004 | Sudarshan et al. | 719/316 |

OTHER PUBLICATIONS

Mitchell, J.G. et al., "An Overview of the Spring System", *Compcon: Digest of Technical Papers*, 1994, 39, 122-131.

* cited by examiner

*Primary Examiner*—Andy Ho
(74) *Attorney, Agent, or Firm*—Woodcock Washburn LLP

(57) ABSTRACT

An operating system architecture is based on a service model in which active entities (services) are containers for objects having a number of interfaces specified through a contract language that is a subset of the language in which the service is coded. Services may reside in the same address space or may reside in separate address spaces, without changing the programming model or compiled binaries. The location of a service is independent of the location of the service's clients and of services the service calls.

16 Claims, 5 Drawing Sheets

400

```
module: NG.NGContract]
namespace NG
{
```

```
public class TypeMismatchException : NG.UserException          406
{
    public TypeMismatchException() : base () {}
    public TypeMismatchException(string s) : base(s) {}
}
```

```
public class TypeNotFoundException: NG.UserException           408
{
    public TypeNotFoundException() : base () {}
    public TypeNotFoundException(string s) : base(s) {}
}
```

```
public struct TypeDef {
    public string typeName;           410
    public int    typeNum;
}
```

```
public interface CTypeServer : NG.Far                          402
{

[Throws(typeof(TypeNotFoundException))]
    int findTypeNumber(string name);

[Throws(typeof(TypeNotFoundException))]
    string findTypeName(int typeNum);

[Throws(typeof(TypeNotFoundException))]
    bool   inheritsFrom(int leafI, int baseI);

[Throws(typeof(TypeNotFoundException))]
    int[]  inheritanceChain(int leafI, int baseI);

[Throws(typeof(TypeNotFoundException))]
    int[]  inheritanceChain(int leafI);

/*
    [Throws(typeof(TypeNotFoundException))]
```

FIG. 4a

```
        string GetContractFile(int typeNum);            402 cont.
*/
        [Throws(typeof(TypeNotFoundException))]
        string[] GetContractFiles(int typeNum);

[Throws(typeof(TypeNotFoundException))]
        string[] GetContractFiles(string typeName);

[Throws(typeof(TypeNotFoundException))]
        int GetCompleteTypeInfo(int typeNum,
                                out string[] contractFiles,
                                out string[] proxyFiles,
                                out TypeDef[] types);
/*
        [Throws(typeof(TypeNotFoundException))]
        string GetProxyFile(int typeId);
*/
        [Throws(typeof(TypeNotFoundException))]
        string[] GetProxyFiles(int typeId);

[Throws(typeof(TypeNotFoundException))]
        string[] GetProxyFiles(string typeName);

[Throws(typeof(TypeNotFoundException))]
        int GetProxyAndTypeInfo(string typeName,
                                out string[] proxyFiles,
                                out TypeDef[] types);

[Throws(typeof(TypeMismatchException))]
        int registerContract(string cName, bool temporary);

[Throws(typeof(TypeMismatchException))]
        int registerContracts(string[] contractNames, bool temporary);
    } public interface CFullTypeServer : CTypeServer
    {
        [Throws(typeof(TypeMismatchException))]
        int registerType(string cName, int[] extends);
    }                                                           404
}
```

STRUCTURING AN OPERATING SYSTEM USING A SERVICE ARCHITECTURE

CROSS-REFERENCE TO RELATED CASES

This application is related in subject matter to U.S. patent application Ser. No. 11/130,308 entitled "Coordinating Reference Counting Between Entities Executing Within Separate Address Spaces" filed May 16, 2005, U.S. patent application Ser. No. 11/129,848 entitled "A Cancellation Mechanism for Cooperative Systems" filed May 16, 2005, U.S. patent application Ser. No. 11/130,293 entitled "Type Server Caching the Proxy/Stub Generation" filed May 16, 2005, U.S. patent application Ser. No. 11/130,301 entitled "Self-Registering Objects for an Inter-Process Communication Mechanism" filed May 16, 2005 and U.S. patent application Ser. No. 11/130,300 entitled "Coordination of Set Enumeration Information Between Independent Agents".

FIELD OF THE INVENTION

The invention relates to computer operating systems and in particular to an operating system whose architecture is based on a service model.

BACKGROUND OF THE INVENTION

A standard way to communicate between two processes A and B (running on the same machine or running on different machines) is to send a message. Often, for example, it is desirable to enable process A to send a message to process B asking process B to execute code on behalf of process A. Typically, process A must have knowledge of a port or contact point for process B in order to do this.

One way to enable process A to call process B is via a remote procedure call (RPC). A remote procedure call enables a process on one computer to cause code to be executed in another process on the same or on a different computer, without requiring explicit code to be written by a developer or programmer to perform that particular call. An RPC is initiated by the caller process (client) sending a request message to a remote system or second process (server) to execute a certain procedure using supplied arguments. A result message is returned to the caller. For example, in a remote procedure call, a function call may be made by process A, in which the name of the procedure that process B is to execute on behalf of process A and a set of parameters for the procedure, are specified. Process B executes the code and returns a message to process A. When the code in question is written using principles of object-oriented programming, RPC is sometimes referred to as remote invocation or remote method invocation.

A remote procedure call typically follows a particular protocol (another way of saying this is "it uses a particular interface") so that potentially unrelated processes can communicate. The protocol or interface define the methods and the values which the processes agree upon in order to cooperate.

The procedure of transforming the function call into a message is called marshalling. Marshalling may include gathering data from one or more applications or non-contiguous sources in computer storage, putting the data pieces into a message buffer, and organizing or converting the data into a format that is prescribed for a particular receiver or programming interface. Marshalling typically converts what the code in process A sees as a function call into a message to be sent to process B. The message typically includes the name of the function and a set of parameters, coded in a way that process B understands. Process B receives the message and has to transform the message into a call to process B's internal function. The process of converting a message into a function call is called unmarshalling. The piece of code that performs marshalling in process A is called a proxy and typically resides in the client process. The corresponding piece of code on the server side that performs unmarshalling is called a stub.

Within the context of object oriented programming, process A and process B can be viewed as objects encapsulating data and functions. Some well-known technologies that take this approach are Sun Microsystem's JAVA and Microsoft's COM and DCOM. That is, process B may be viewed as a container for one or multiple objects, whose methods are the functions invoked by process A. In object oriented systems, therefore, process A invokes a method of a particular object of process B instead of invoking a function in process B. To do this, process A must have some way of identifying the object in process B that process A wishes to invoke.

The data stored in process A which enables process A to identify the object of process B is known as a reference to the object. The reference stores information concerning how to locate the object: that is, the reference must be sufficient to identify the process and within the process to identify the object whose method is to be invoked.

It is often desirable to share resources within a computer system. As described above, one convenient way to share resources is through an interface that provides programmatic access to the shared resource. The program responsible for the resource is called the server and employs a stub program to handle access requests for the particular type of resource being shared. The program seeking access is called the client and employs a proxy program to make the request for the particular type of resource being requested.

An interface definition language (IDL) is a computer language or syntax employed to specify interfaces and is commonly found in software intended to allow remote procedure calls. In these cases the call semantics may vary not only between languages, but also due to the architecture of the communicating machines. An IDL is part of the distributed computing environments of COM, SOM, XPCOM (also known as XPIDL), CORBA, and SOAP for Web Services. When an IDL is used to specify an interface, a mapping from the IDL to the implementation language (like C++ or Java) is required. The mapping precisely describes how the IDL data types are to be used in both client and server implementations. It would be helpful if there were a way to eliminate the need for mappings.

SUMMARY OF THE INVENTION

An operating system architecture is based on a service model in which active entities (services) are objects having a number of interfaces specified through a contract language that is a subset of the language in which the service is coded. Services may reside in the same address space or may reside in separate address spaces, without changing the programming model or compiled binaries. The location of a service is independent of the location of the service's clients and of services the service calls.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIGS. 4a-4b is an exemplary contract file in accordance with one embodiment of the invention.

DETAILED DESCRIPTION OF ILLUSTRATIVE EMBODIMENTS

Overview

To invoke a method provided through a reference by an object, client and server must agree on the interface or protocol made available through the reference. One way to do this is by using an Interface Definition Language (IDL). Typically, an IDL will provide only those constructs needed to define the interface and structures to store data. To build code using a particular programming language, the IDL definitions must be mapped to constructs within that particular programming language. This task can be viewed as data mapping (for data passed through invocations) and interface mapping. When the programming language is object oriented, it is common practice to employ the language-provided artifacts to perform the mapping of the IDL-defined interfaces to the programming language constructs. In accordance with the invention, the mapping of IDL to programming language construct is eliminated by the use of a subset of the programming language to specify interfaces.

Exemplary Computing Environment

Figure 1:
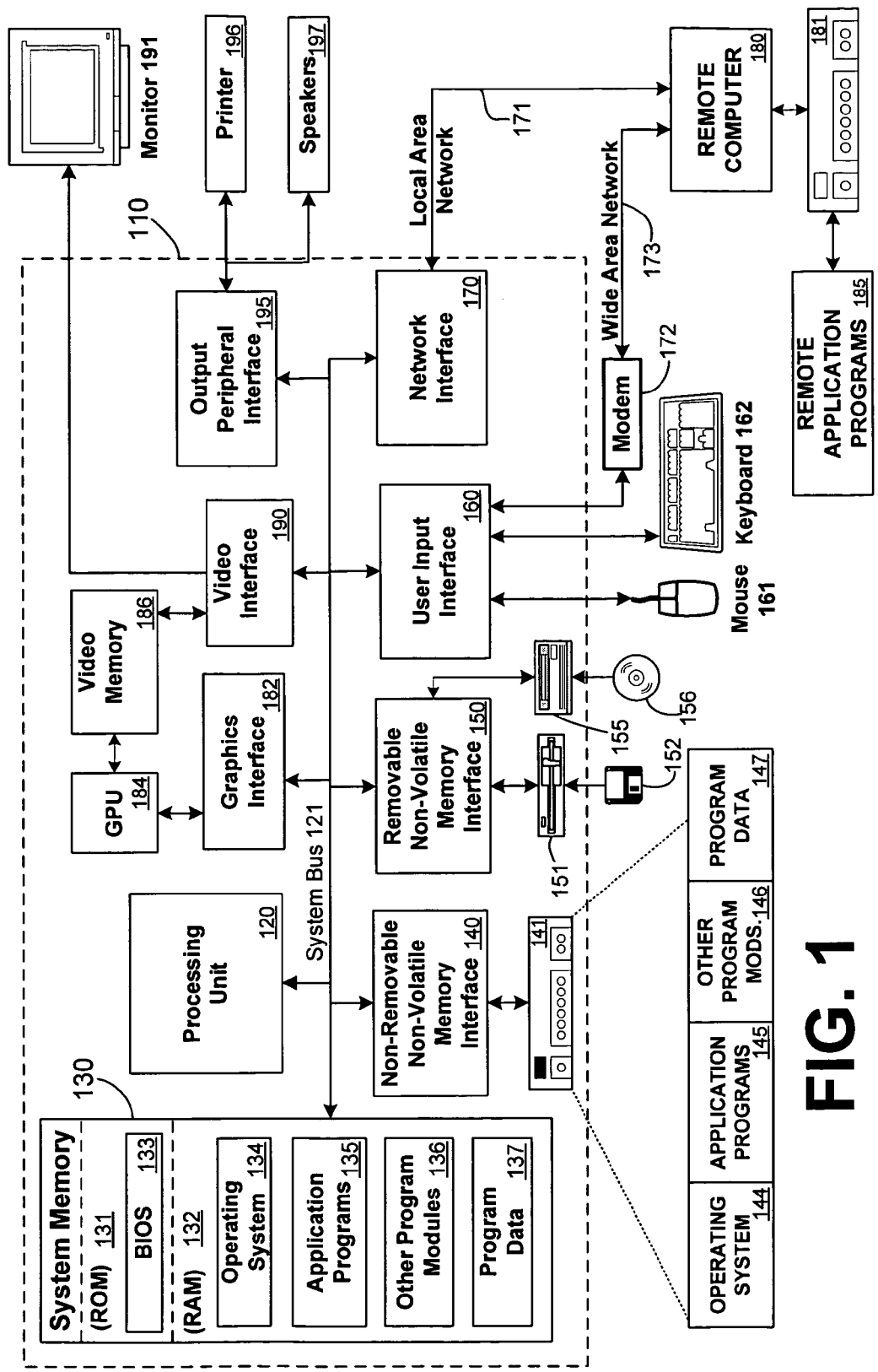
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Operating System Based on a Service Model Architecture

Figure 2:
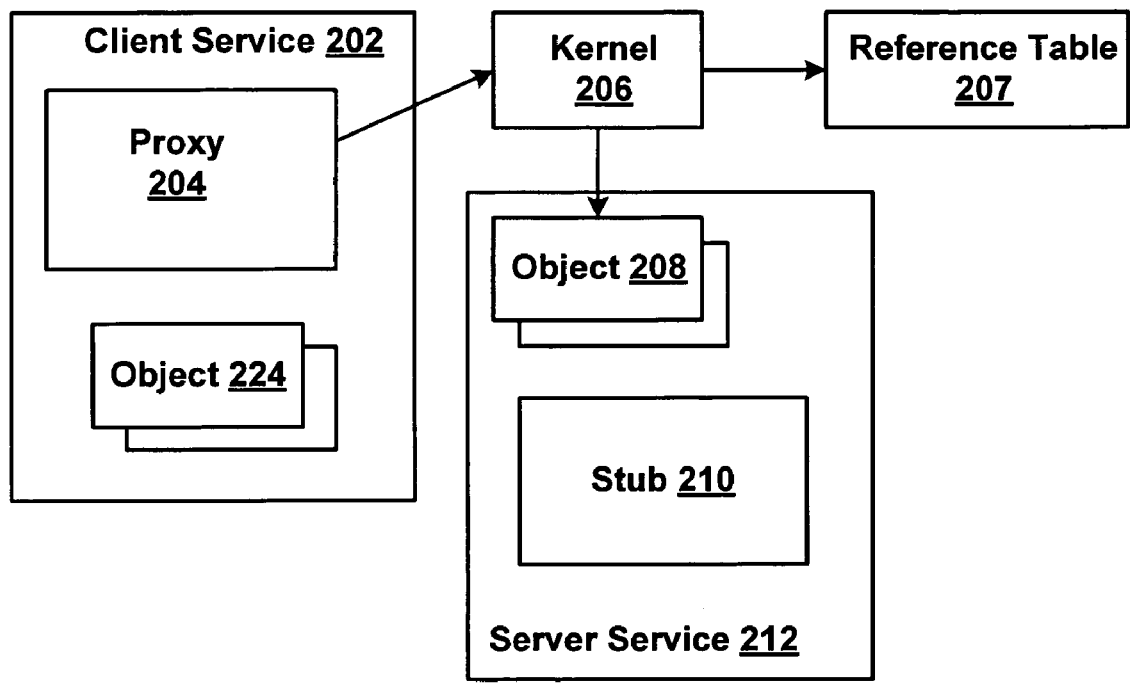
FIG. 2 is a block diagram illustrating relationships between services in an exemplary service-based operating system in accordance with one embodiment of the invention.

FIG. 2 is a block diagram illustrating the relationship of services in a service-based operating system in accordance with some embodiments of the invention. The operating system or portions thereof may reside on or may access one or more computers such as computer 110 described with respect to FIG. 1.

In some embodiments of the invention, the operating system includes entities that are processes, agents, services, components or modules comprising containers for objects or resources that are described through interfaces. FIG. 2 illustrates an exemplary "client" service 202 and an exemplary "server" service 212, although it will be appreciated that any number of client services and server services may exist in the operating system. Moreover, a "client" service in one interaction may act as a "server" service in another: that is, "client" and "server" terminology refers to roles within a particular interaction rather than to intrinsic differences in hardware, software, and so on. Each service may be implemented through the use of one or more objects. For example, in FIG. 2, the client service 202 includes a proxy object 204. The client service 202 may also include one or more other objects or resources, as represented by object 224. Similarly, the server service 212 may include a stub 210 and one or more objects, as represented by object 208. A service may require support from one or more other services and the code specifying the service may require the loading of specific run-time support to run correctly. Services may reside in the same address space in the local machine or in a computer of a computer network. Services alternatively may reside in different address spaces in the local machine or on different computers of a computer network.

A trusted entity may be viewed as a unique distinctive process, module, component, agent or service that mediates communications between processes in the system. In some embodiments the trusted entity is able to distinguish between data parameters and reference parameters in messages passed between processes. In some embodiments the trusted entity has a trusted channel to every agent, service, module, component or process for mediating resource access and reference. Communications with the trusted entity therefore are secure, meaning that processes other than the trusted entity are unable to access or modify transmissions or messages sent between processes. Moreover, the trusted entity may be capable of identifying the originator of a message.

In some embodiments of the invention, the trusted entity is the kernel 206. The kernel 206 can implement and expose its objects (not shown) to other services, such as to services 202 and 212 in FIG. 2. In some embodiments of the invention, the kernel 206 is trusted code. In some embodiments of the invention, the only trusted code is the kernel 206. In some embodiments, to avoid forgery of object references, only trusted code is able to manipulate an object reference. Hence in some embodiments of the invention, only the kernel 206 is able to manipulate an object reference. A service that holds a reference to an object refers to the reference by a representation referred to herein as a reference or as a local reference id. In some embodiments of the invention, the local reference id is understood only by the kernel 206. Hence, for example, a communication sent by client service 202 to a server service 212 invoking a method of object 208 would be mediated by kernel 206. Kernel 206 in some embodiments of the invention, creates and maintains one or more reference tables, as represented by reference table 207 in FIG. 2, to resolve the object reference received from client service 202 to the address of an object 208 to be invoked.

A service may communicate with another service by sending a method invocation to another object via an object reference (e.g., via a remote call). All communications among services are assumed to be and are treated as though they are remote. The client and server services may be in separate (remote) containers or may be co-located in the same container but in either case, the semantics of the call is remote.

A service interface may be specified in an interface definition language or via a contract. In some embodiments of the invention, a subset of an existing language, such as but not limited to C#, is used to define the contract. In some embodiments of the invention, a subset of the application implementation language, such as but not limited to C#, is used to define the interfaces. A service written in C# therefore will seamlessly integrate with the C# contract without requiring the mapping necessitated in traditional systems which use an IDL language for contracts. Services written in other languages such as for example, unmanaged C++ may have a translation table which maps constructs from the C# interface to constructs in C++. Resultant C++ services can interoperate with the C# service as long as the system service model and interface definitions are not violated.

FIGS. 4a-b illustrates an exemplary contract file 400. Exemplary contract file 400 is a C# code file, although it will be appreciated that another language, as described above may be used for the contract file. Only a subset of the C# language is used in contract file 400. Validation may be performed when the contract file is processed, to ensure that only the proper subset of the C# language is used. Because C# is used instead of an interface definition language, it may at times be necessary to provide annotations called "attributes" (a mechanism within C# and the .NET environment) in order to provide extra information to the post-processing tools. Attributes in some embodiments are distinguished by placing the attribute between square brackets: "[ ]".

Exemplary class definitions TypeMismatchException 406 and TypeNotFoundException 408 define exceptions which can be thrown as a result of the execution of a method encountering an unexpected condition which prevents normal processing of the method.

In some embodiments of the invention, the class definition syntax of C# is used because that is how exceptions themselves are defined in C#, enabling the translation of the contract file into C# to be minimal or unnecessary. To mark those exceptions as being within the IPC system, the classes may inherit from the marker class NG.UserException. An exemplary struct type is also defined in exemplary contract file 400: TypeDef 410. TypeDef 410 is used to exchange interface name/typeID information, which is reflected in the two fields, one a string, the other an integer, in the struct definition. Exemplary contract file 400 defines two different interfaces, CTypeServer 402 and CFullTypeServer 404. Exemplary interface CTypeServer inherits from a base interface NG.Far. CFullTypeServer, inherits from CTypeServer, and includes additional "privileged" methods. The definition of the CTypeServer interface 402 consists of the list of interfaces from which it inherits (one in this case), and the list of methods introduced by this definition, in this case, findTypeNumber, findTypeName, inheritsFrom, inheritanceChain (2 versions), inheritanceChain, GetContractFiles (2 versions), GetContractFiles, GetCompleteTypeInfo, GetProxyFiles, GetProxyFiles, GetProxyAndTypeInfo, registerContract, registerContracts. In this case all the methods are marked with an attribute of type "Throws", indicating which exception(s) can be thrown. Only the contract-defined exceptions, or UserExceptions are registered here. SystemExceptions, (not shown) may be raised at any time during an invocation (i.e., object unavailable, or IPC failure, etc.), and may signal an unexpected condition in the infrastructure of the system, as opposed as in the domain of execution of the server.

Each method in exemplary contract file 400 is defined by specifying the list of parameters. In some embodiments of the invention, system parameter passing can be of three modes: "in", "out" and "inout". "in" parameters are read by the server, and are not specially marked in the contracts (all are assumed "in" by default). "out" parameters are understood as return values: i.e., no value is really passed when the server is called, but a value is collected by the client upon return. They are marked with the "out" keyword. "inout" parameters are a mixture of both modes, in which a value is passed within a variable, and the same variable is used to collect a potentially different value returned by the server. "inout" parameters are marked with ref (not shown). The CFullTypeServer 404 interface inherits from CTypeServer 402, and introduces an additional method: registerType. In some embodiments of the invention, the entire contract file is enclosed within a namespace NG declaration. The namespace declares that all names within the declaration are scoped by the NG. prefix, thus to refer to CTypeServer from outside thecontract file, the fully qualified name, NG.CTypeServer, would have to be used. The file is marked by an attribute, NG.NGContract, identifying the file to be a contract file.

Services may be mapped in a one to one relation to an address space. If such is the case, protection ensues as a consequence of the address space provided by the memory management unit. Alternatively, in some embodiments, multiple services can be located within the same address space. In this case, protection is obtained by a managed code run-time (such as, for example, Microsoft's CLR or Common Language Runtime). Services communicate with each other independent of their location.

Failure and security boundaries in the system may exist at the service level and may be reinforced by hardware protection at the address space and machine levels. Service recovery actions including the ability to restart, and dependency tracking are provided by the operating system. Optimizations may accrue for services that are located within the same address space.

A method invocation can only be interpreted by the receiving object. The receiving object decides what action or actions are to be taken, based on the information passed with the invocation. The information passed may include specific data structures and/or references the invoker passes to the object being invoked.

The set of invocations an object accepts through a particular reference and the way the object is supposed to react to such an invocation is referred to as the interface supported by the object through that reference. Hence, the kernel will not necessarily know what the particular interface implemented by a referenced object is and does not need access to that information. It will be appreciated that it is possible to have different references designating the same object implementation through different interfaces.

An object in some embodiments is an implementation of an interface within some service and is an independent unit of failure. An object may be expressed and coded in any programming language capable of passing parameters and control.

An object reference in some embodiments identifies the object to which the reference refers and is not able to be forged. A reference confers to the holder the authority to invoke any of the methods of the interface for which the reference to the object was created. An object reference may be revoked and may be passed (optionally with restrictions) to another service or to other services as an argument of an invocation or as return results.

Use of an interface so defined enables the definition of a class implementing the interface and whose method implementations are stubs which perform the task of parameter marshalling. Instances of such a class are herein referred to as proxies, the proxies sitting in for the actual objects to which they refer and having the same interface.

In some embodiments of the invention, a MICROSOFT .NET supported object oriented language is used to specify the interface and the data structures used to pass data through invocations. In some embodiments of the invention, the .NET managed language used is C# is used to define remote interfaces and C# Value Types or C# serialization mechanisms to define the data portions to be transferred through an invocation.

Figure 3:
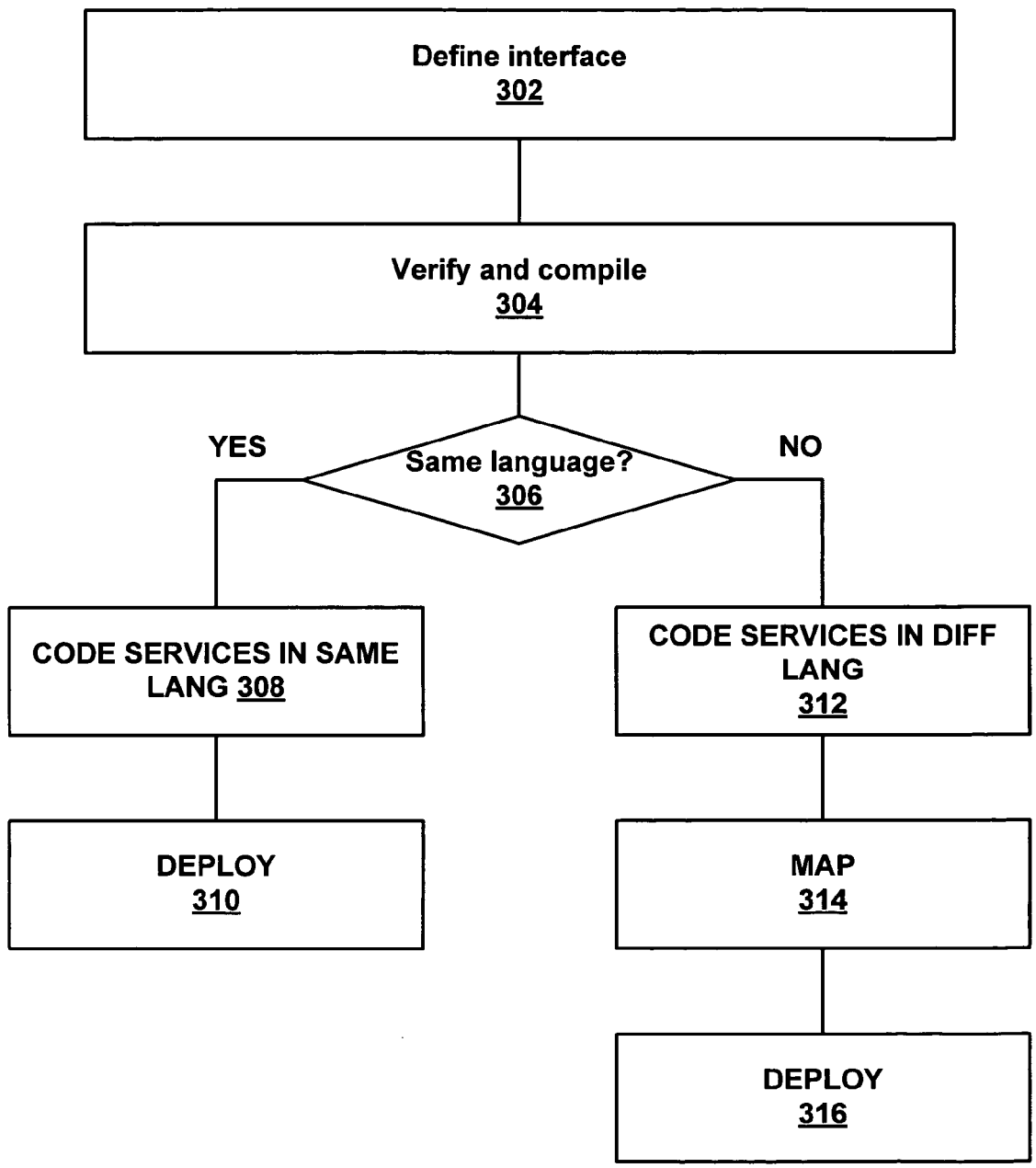
FIG. 3 is a flow diagram of an exemplary method for basing the architecture of an operating system on a service model in accordance with one embodiment of the invention.

FIG. 3 is a flow diagram of a method for basing the architecture of an operating system on a service model in accordance with one embodiment of the invention. At 302 an interface is defined in a subset of a programming language. In some embodiments, the language chosen is a subset of a .NET language such as C#, although any suitable language (such as, for example, any strongly typed language including JAVA, C++, C, Python, Perl, Javascript, COBOL, Smalltalk, Tcl, Ruby, Visual Basic or others) may be used.

At 304 the code is verified and stubs and proxies for the interface are generated. In some embodiments of the invention, proxy and stub code is generated automatically by tools which the operating system provides. At 306 a decision is made as to whether the language the subset of which is used for the interface is to be used for coding the services and objects of the operating system. At 308, if the same language is to be used, the code for the service is generated and at 310 the system is deployed. At 312 if another language is to be used, the code for the service is generated in that language (or languages), the constructs are mapped at 314 and the system is deployed at 316.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A computer system comprising:
    circuitry configured to effectuate an object in a first address space, wherein the object is assigned a reference, the reference identifying an address of the object;
    circuitry configured to store the reference in a table, the table relating the reference to a local identifier;
    circuitry configured to generate a stub for the object in the first address space and a proxy for the object in a second address space;
    circuitry configured to effectuate a kernel, the kernel configured to receive a data structure and the local identifier from the proxy and the kernel is configured to identify the reference for the object in the table, wherein the kernel is further configured to use the address of the object to transmit the data structure to the stub.

2. The system of claim 1, wherein a failure of the stub is independent of a failure of the proxy.

3. The system of claim 1, wherein a communication between the first address space and the second address space is treated as remote.

4. The system of claim 1, wherein the object is described via a plurality of interfaces.

5. The system of claim 1, wherein the proxy is stored in the address space of a client service.

6. The system of claim 1, wherein the stub is stored in the address space of a server service.

7. The system of claim 1, wherein the first address space includes the kernel, the kernel comprising trusted code.

8. The system of claim 1, wherein only the kernel can access the table.

9. A method of building an operating system using a service model architecture comprising:
   receiving an interface defined in a subset of a programming language;
   generating, by a kernel of an operating system, a proxy and a stub for the interface;
   storing, by the kernel of the operating system, the proxy in a first address space and the stub in a second address space; and
   generating, by the kernel of the operating system, a set of objects and services in the programming language, wherein the set of objects and services are configured to use the proxy stored in the first address space and the stub stored in the second address space.

10. The method of claim 9, wherein the programming language is a managed language.

11. The method of claim 9, wherein the programming language is C#.

12. The method of claim 9, wherein the set of objects and services resides in a single container.

13. The method of claim 9, wherein the set of objects and services reside in a plurality of containers.

14. A computer-readable storage medium comprising computer-executable instructions, the computer readable-storage medium comprising:
   instructions for receiving an interface defined in a subset of a programming language;
   instructions for effectuating a kernel of an operating system, the instructions for effecting the kernel including instructions for generating a proxy and a stub for the interface;
   the instructions for effecting the kernel further including instructions for storing the proxy in a first address space and the stub in a second address space; and
   the instructions for effectuating the kernel further including instructions for generating a set of objects and services in the programming language, wherein the set of objects and services are configured to use the proxy stored in the first address space and the stub stored in the second address space.

15. The computer-readable medium of claim 14, wherein the programming language is C#.

16. The computer-readable medium of claim 14, wherein the programming language is a managed code language.

* * * * *